(12) United States Patent
Kakemizu et al.

(10) Patent No.: US 8,539,814 B2
(45) Date of Patent: Sep. 24, 2013

(54) MATERIAL MEASURES FOR USE IN EVALUATING PERFORMANCE OF MEASURING INSTRUMENT FOR MEASURING SURFACE TEXTURE

(75) Inventors: Takahiko Kakemizu, Tokyo (JP); Akihiro Fujii, Tokyo (JP)

(73) Assignee: Olympus Corporation, Tokyo (JP)

( * ) Notice: Subject to any disclaimer, the term of this patent is extended or adjusted under 35 U.S.C. 154(b) by 557 days.

(21) Appl. No.: 12/853,762

(22) Filed: Aug. 10, 2010

(65) Prior Publication Data
US 2011/0041593 A1 Feb. 24, 2011

(30) Foreign Application Priority Data
Aug. 19, 2009 (JP) ................................. 2009-189864

(51) Int. Cl.
 *G01B 5/28* (2006.01)
 *G01B 3/30* (2006.01)
 *G01B 21/04* (2006.01)
(52) U.S. Cl.
 CPC .. *G01B 5/28* (2013.01); *G01B 3/30* (2013.01); *G01B 21/042* (2013.01)
 USPC .................. 73/1.89; 73/1.01; 73/1.79; 33/567
(58) Field of Classification Search
 CPC .............. G01B 3/14; G01B 3/30; G01B 5/20; G01B 5/28; G01B 21/04; G01B 21/042; G01B 21/20; G01B 21/30; G01Q 40/02
 USPC ............... 33/502, 567–567.1; 73/1.01, 1.75, 73/1.79–1.81, 1.89, 105; 356/243.1, 243.4, 356/243.7, FOR. 106; 850/20
See application file for complete search history.

(56) References Cited

U.S. PATENT DOCUMENTS

| | | | |
|---|---|---|---|
| 2,715,830 A * | 8/1955 | Lewis et al. | 73/1.89 |
| 3,087,246 A * | 4/1963 | Busch | |
| 4,236,823 A * | 12/1980 | Roach et al. | 356/521 |
| 4,364,663 A * | 12/1982 | Gardner et al. | 356/600 |

(Continued)

FOREIGN PATENT DOCUMENTS

| | | |
|---|---|---|
| DE | 103 18 762 B3 | 12/2004 |
| EP | 628809 A1 * | 12/1994 |

(Continued)

OTHER PUBLICATIONS

Akihiro Fujii et al. A study on response properties of surface texture measuring instruments in terms of surface wavelengths, Theses of the Lectures of the Academic Lecture Meeting in Spring 2009 of the Institute of Precision Industry, p. 495-496, translated from Japanese.*

(Continued)

*Primary Examiner* — Thomas P Noland
(74) *Attorney, Agent, or Firm* — Scully, Scott, Murphy & Presser, P.C.

(57) ABSTRACT

A material measure for use in evaluating the performance of a measuring instrument for measuring surface texture includes: a measurement area having a plurality of grooves in a predetermined direction. With the configuration, each of the grooves has a simple cross-sectional shape at a cross-section along the predetermined direction; and a length of the cross-sectional shape in the predetermined direction is different for the predetermined number of adjacent grooves in the predetermined direction.

13 Claims, 16 Drawing Sheets

(56) References Cited

U.S. PATENT DOCUMENTS

| | | | |
|---|---|---|---|
| 5,109,609 A * | 5/1992 | Anderson | 33/502 |
| 5,520,769 A * | 5/1996 | Barrett et al. | 850/20 X |
| 5,567,864 A * | 10/1996 | Coon et al. | 73/1.81 |
| 5,578,745 A * | 11/1996 | Bayer et al. | 73/105 X |
| 5,671,541 A | 9/1997 | Dai et al. | |
| 5,941,143 A * | 8/1999 | Jawahir et al. | 82/1.11 |
| 6,028,008 A * | 2/2000 | Bayer et al. | |
| 6,591,658 B1* | 7/2003 | Yedur et al. | 73/1.89 |
| 7,797,991 B2* | 9/2010 | Ukraintsev | 73/105 |
| 2005/0252282 A1 | 11/2005 | Chand et al. | |
| 2007/0148792 A1* | 6/2007 | Marx et al. | 438/14 |

FOREIGN PATENT DOCUMENTS

| | | |
|---|---|---|
| EP | 0 676 614 A1 | 10/1995 |
| EP | 1475603 A2 * | 11/2004 |
| JP | 11094862 A * | 4/1999 |
| JP | 2006064459 A * | 3/2006 |
| JP | 2006177713 A * | 7/2006 |
| WO | WO 9908065 A1 * | 2/1999 |
| WO | WO 2004010075 A1 * | 1/2004 |

OTHER PUBLICATIONS

Standard No. JISB0659-1 "Geometrical Product Specifications (GPS)—Surface Texture: Profile method; Measurement standards—Part i: Material Measures", pp. 649-661, 2007, p. 649—section 6.5.2 on p. 654 translated from Japanese.*
Extended European Search Report dated Dec. 15, 2010 for EP 10 00 8304.
European Office Action dated Feb. 12, 2013 from corresponding European Patent Application No. 10 008 304.7.

* cited by examiner

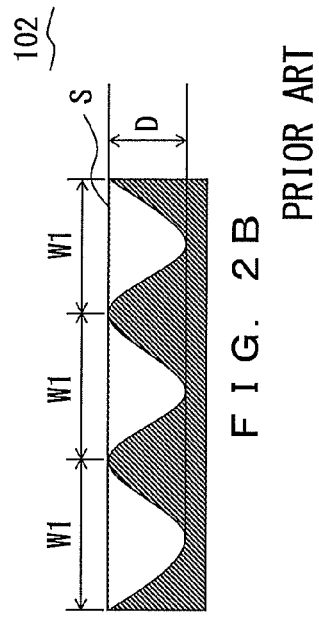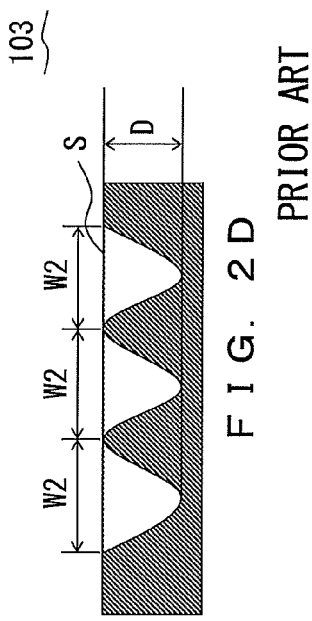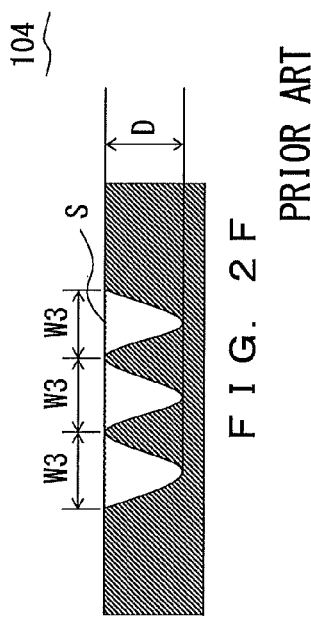
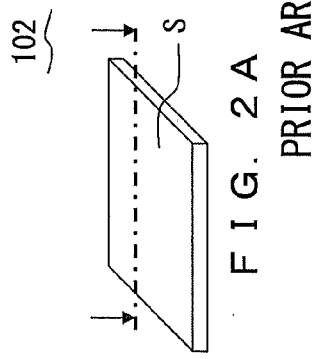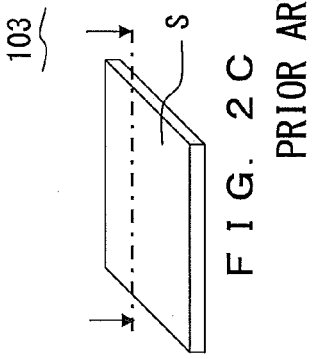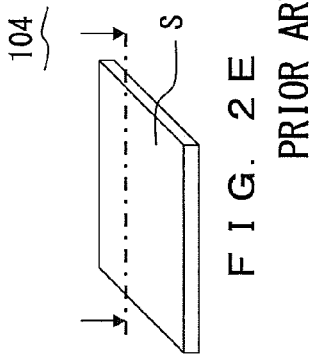
FIG. 2A PRIOR ART
FIG. 2B PRIOR ART
FIG. 2C PRIOR ART
FIG. 2D PRIOR ART
FIG. 2E PRIOR ART
FIG. 2F PRIOR ART

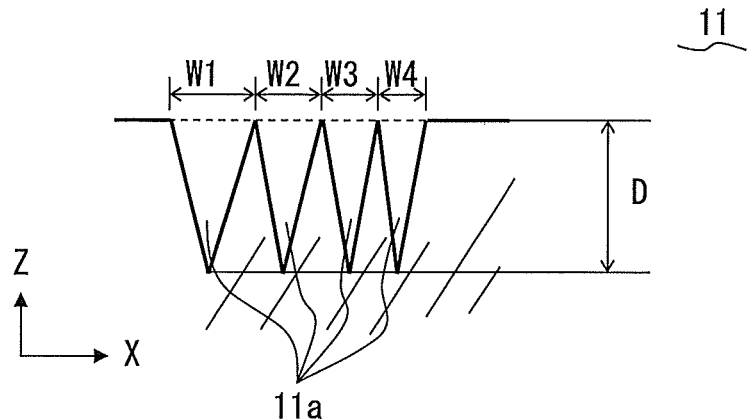
F I G. 6 A
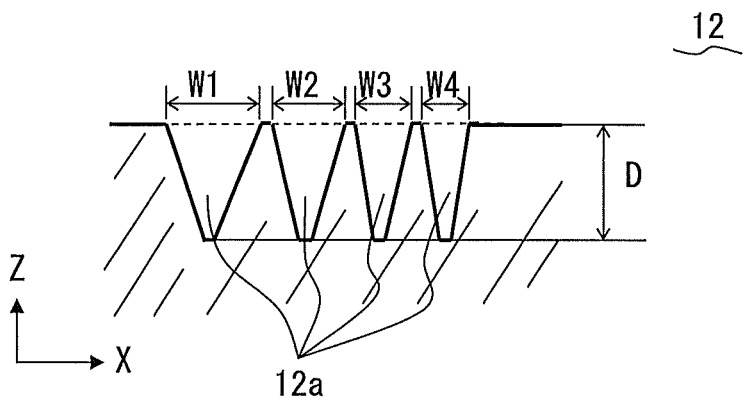
F I G. 6 B
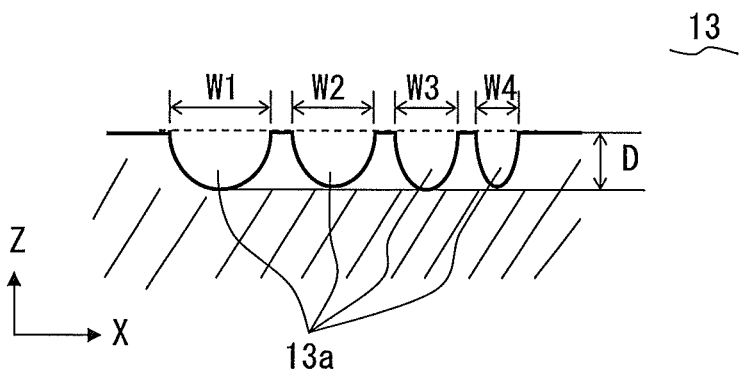
F I G. 6 C

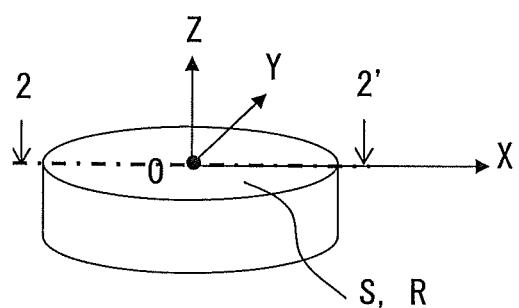
F I G. 7A
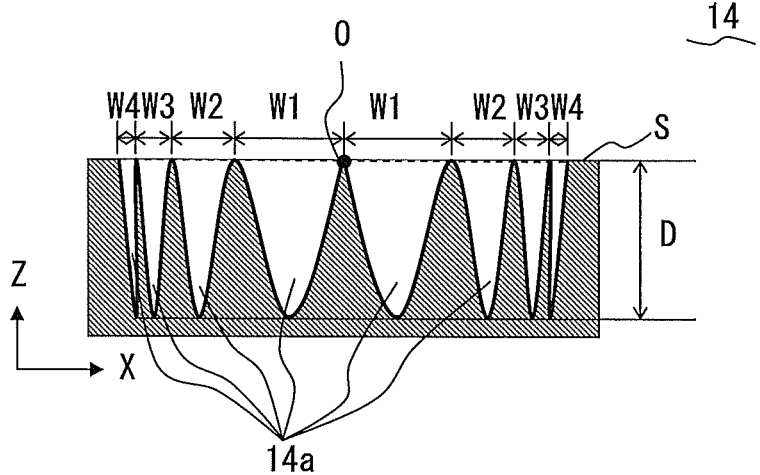
F I G. 7B

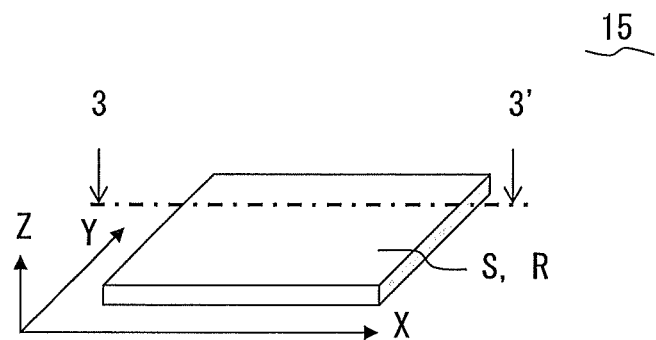
F I G. 8A
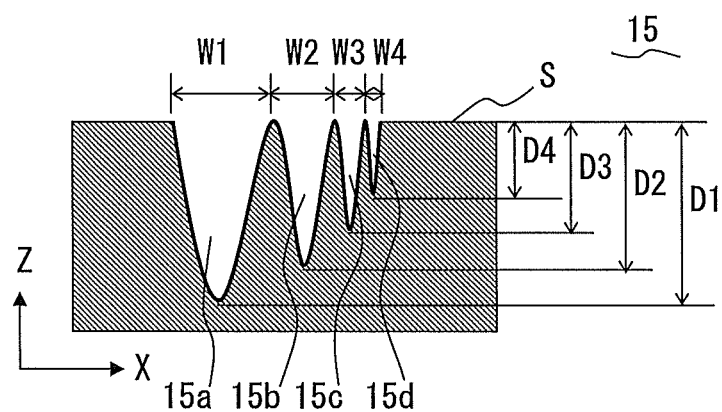
F I G. 8B

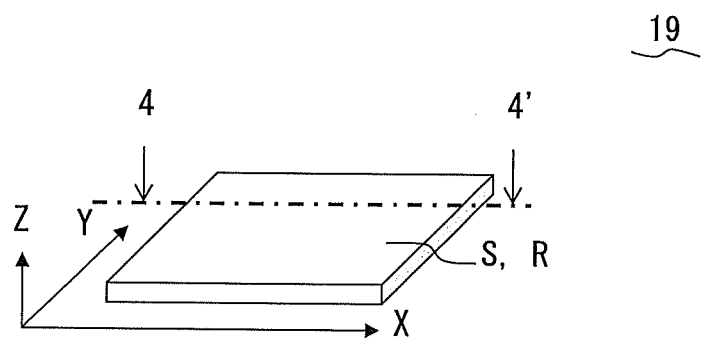
F I G. 1 0 A
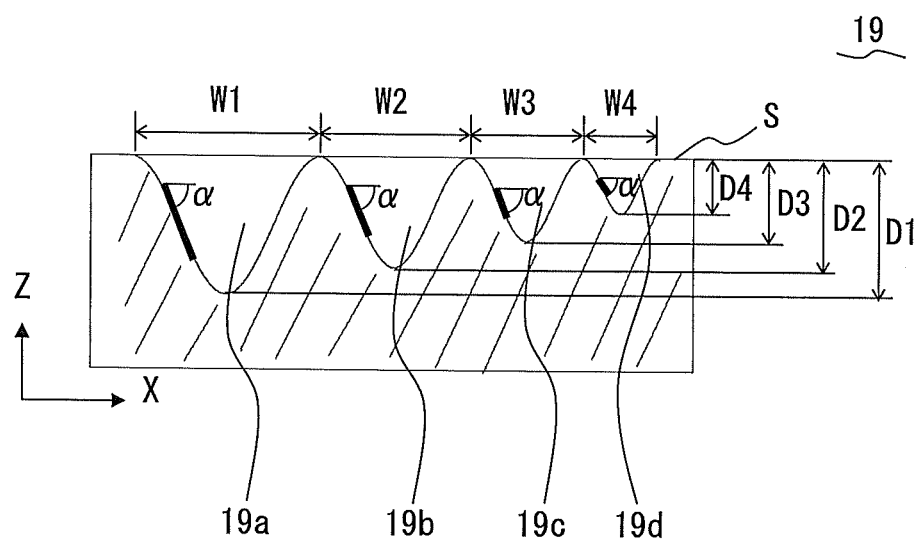
F I G. 1 0 B

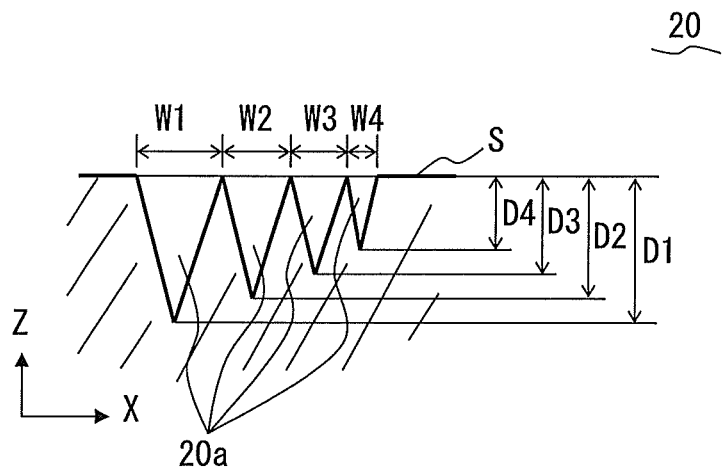
F I G. 1 2 A
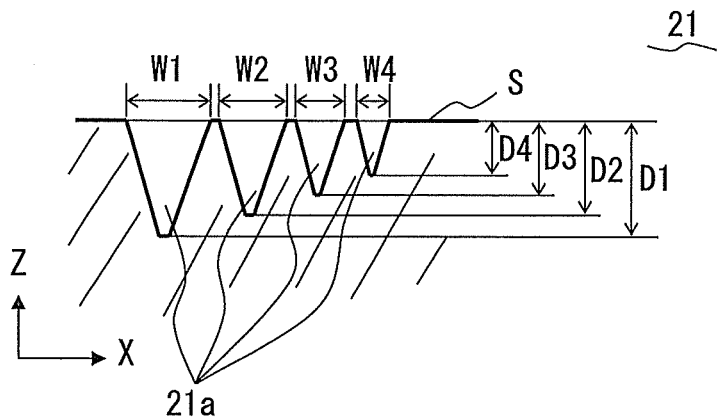
F I G. 1 2 B
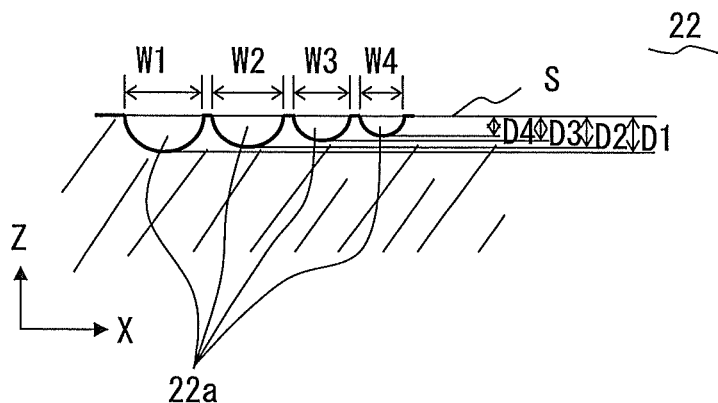
F I G. 1 2 C

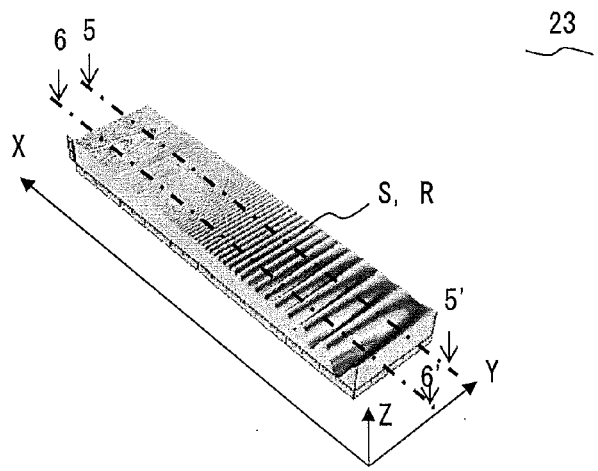
F I G. 1 3 A
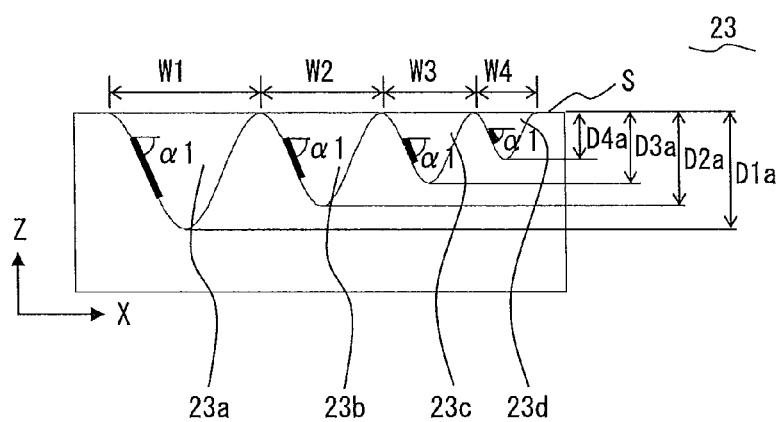
F I G. 1 3 B
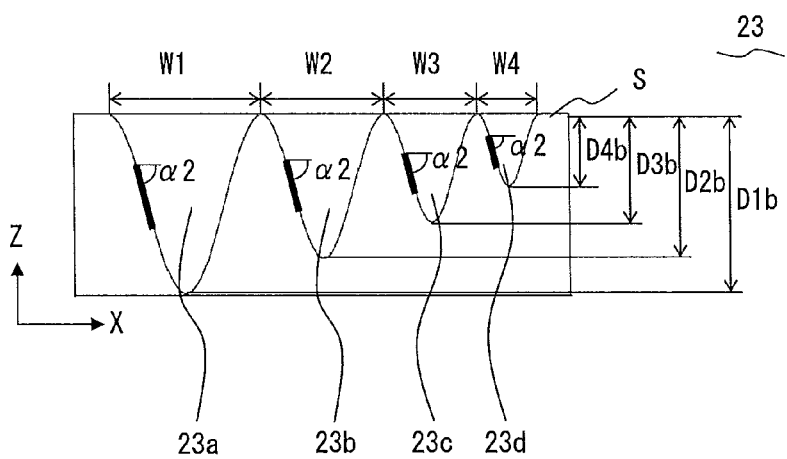
F I G. 1 3 C

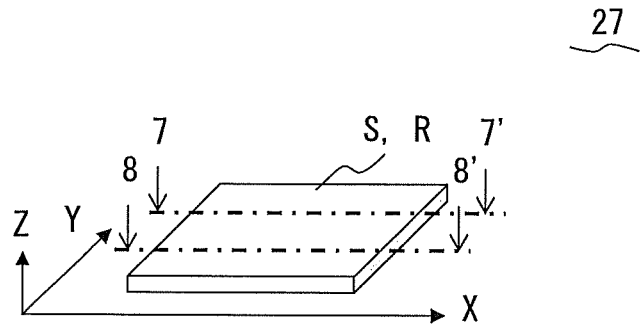
F I G. 1 5 A
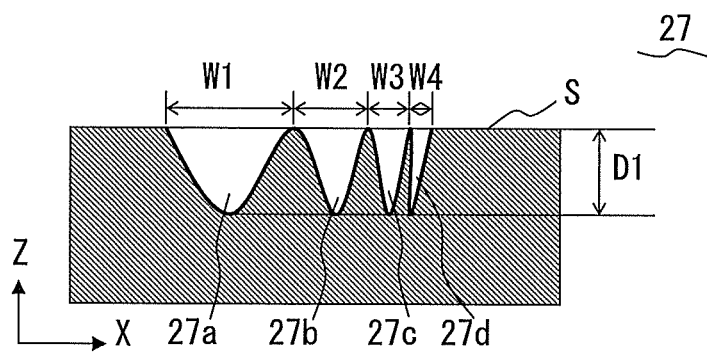
F I G. 1 5 B
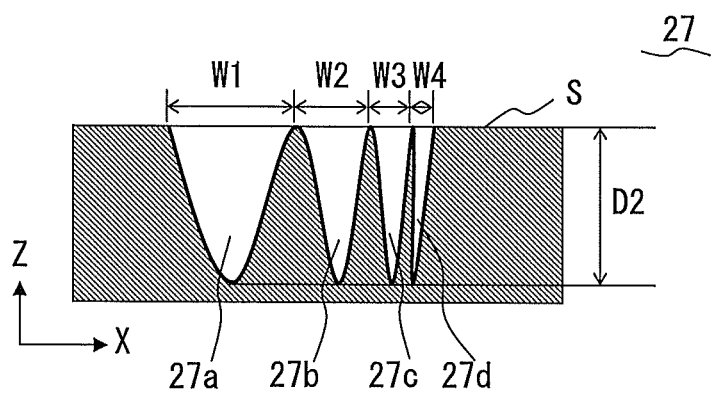
F I G. 1 5 C

MATERIAL MEASURES FOR USE IN EVALUATING PERFORMANCE OF MEASURING INSTRUMENT FOR MEASURING SURFACE TEXTURE

CROSS REFERENCE TO RELATED APPLICATIONS

This application is based upon and claims the benefit of priority from the prior Japanese Patent Application No. 2009-189864, filed Aug. 19, 2009, the entire contents of which are incorporated herein by this reference.

BACKGROUND OF THE INVENTION

1. Field of the Invention

The present invention relates to the technology of material measures for use in evaluating the performance of a measuring instrument for measuring surface texture.

2. Description of the Related Art

A means for evaluating the performance of a measuring instrument for measuring surface texture can be a method of using material measures whose surfaces have a plurality of grooves.

There are various types of material measures, but the material measures whose surfaces have grooves having the same shapes in a predetermined direction as described in Standard Number JISB0659-1 "Geometrical Product Specifications (GPS)—Surface Texture Profile method; Measurement standards—Part 1: Material Measures" have become widespread lately.

The groove shapes of material measures are in many cases simple from the viewpoint of easy evaluation, processing, etc. For example, material measures 100 having the cross-sectional shapes of grooves 101 exemplified in FIGS. 1A through 1D, that is, a sine wave shape (refer to FIG. 1A), a triangle shape (refer to FIG. 1B), a trapezoid shape (FIG. 1C), and an arc shape (refer to FIG. 1D), are known.

The performance of a measuring instrument is evaluated by whether or not the shape of the groove 101 of the material measure 100 can be appropriately measured. To be more concrete, for example, there is a method of evaluating the performance of a measuring instrument by checking the change in measurement accuracy of the depth (amplitude) of a groove to the width (cycle) of the groove (hereinafter referred to as a response characteristic) described in the Theses of the Lectures of the Academic Lecture Meeting in Spring 2009 of the Institute of Precision Industry, p. 495-496 (by Akihiro Fujii and Kazuhisa Yanagi "A study on response properties of surface texture measuring instruments in terms of surface wavelengths".

When the response characteristic of a measuring instrument is checked using a material measure formed by arranging the grooves of the same shape on its surface to evaluate the performance of the measuring instrument, for example, a plurality of material measures (material measures 102, 103, and 104) having equal depths (depth D) and different widths (widths W1, W2, and W3) of grooves as exemplified in FIGS. 2A through 2F are prepared and measured respectively.

In this case, if the cross-section of a groove is triangle-shaped as exemplified in FIGS. 3A through 3B, the inclination angle of the groove whose cross-section is triangle-shaped changes with the change of the width of the groove. In FIGS. 3A and 3B, the inclination angles of the grooves change from the angle θ1 to the angle θ2. In addition, as exemplified in FIGS. 4A and 4B, if the cross-section of a groove is sine-wave-shaped, the maximum inclination angle of the groove whose cross-section is sine-wave-shaped changes. In FIGS. 4A and 4B, the maximum inclination angles of the grooves change from the angle θ3 to the angle θ4.

SUMMARY OF THE INVENTION

An aspect of the present invention provides a material measure which is used in evaluating the performance of a measuring instrument for measuring surface texture, which has a measurement area including a plurality of grooves in a predetermined direction, each of whose grooves cross-section and has a simple cross-sectional shape at a cross-section along the predetermined direction, and the length in the predetermined direction of whose cross-sectional shape is different for predetermined number of grooves adjacent in the predetermined direction.

BRIEF DESCRIPTION OF THE DRAWINGS

The present invention will be more apparent from the following detailed description when the accompanying drawings are referenced.

FIG. 2A is a perspective view of a material measure according to the prior art for use in checking the response characteristic of the depth of the groove to the width of the groove;

FIG. 2B is a cross-sectional view of a material measure according to the prior art exemplified in FIG. 2A;

FIG. 2C is a perspective view of another material measure according to the prior art for use in checking the response characteristic of the depth of the groove to the width of the groove;

FIG. 2D is a cross-sectional view of a material measure according to the prior art exemplified in FIG. 2C;

FIG. 2E is a perspective view of a further material measure according to the prior art for use in checking the response characteristic of the depth of the groove to the width of the groove;

FIG. 2F is a cross-sectional view of a material measure according to the prior art exemplified in FIG. 2E;

FIG. 6A exemplifies a variation of the material measure according to embodiment 1;

FIG. 6B exemplifies another variation of the material measure according to embodiment 1;

FIG. 6C exemplifies a further variation of the material measure according to embodiment 1;

FIG. 7A is a perspective view exemplifying a further variation of the material measure according to embodiment 1;

FIG. 7B is a cross-sectional view of the material measure exemplified in FIG. 7A;

FIG. 8A is a perspective view exemplifying the material measure according to embodiment 2;

FIG. 8B is a cross-sectional view of the material measure exemplified in FIG. 8A;

FIG. 10A is a perspective view exemplifying the material measure according to embodiment 3;

FIG. 10B is a cross-sectional view of the material measure exemplified in FIG. 10A;

FIG. 12A exemplifies a variation of the material measure according to embodiment 3;

FIG. 12B exemplifies another variation of the material measure according to embodiment 3;

FIG. 12C exemplifies a further variation of the material measure according to embodiment 3;

FIG. 13A is a perspective view exemplifying the material measure according to embodiment 4;

FIG. 13B is a cross-sectional view of a cross-section of the material measure exemplified in FIG. 13A;

FIG. 13C is a cross-sectional view of another cross-section of the material measure exemplified in FIG. 13A;

FIG. 15A is a perspective view exemplifying the material measure according to embodiment 5;

FIG. 15B is a cross-sectional view of a cross-section of the material measure exemplified in FIG. 15A;

FIG. 15C is a cross-sectional view of another cross-section of the material measure exemplified in FIG. 15A.

DESCRIPTION OF THE PREFERRED EMBODIMENTS

Each embodiment of the present invention is described below with reference to the attached drawings.
<Embodiment 1>

Figure 1A:
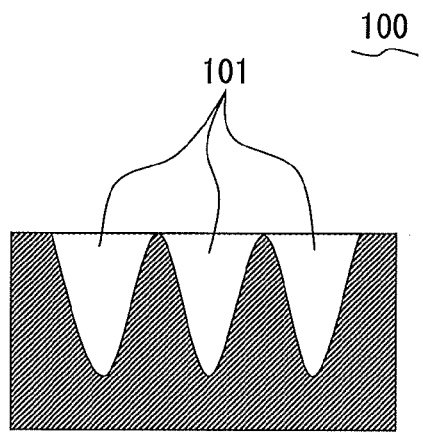
FIG. 1A exemplifies the cross-sectional shape of the groove of a material measure according to a prior art.
Figure 1B:
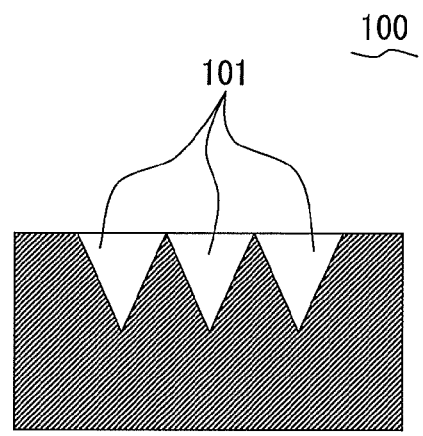
FIG. 1B exemplifies the cross-sectional shape of the groove of another material measure according to a prior art.
Figure 1C:
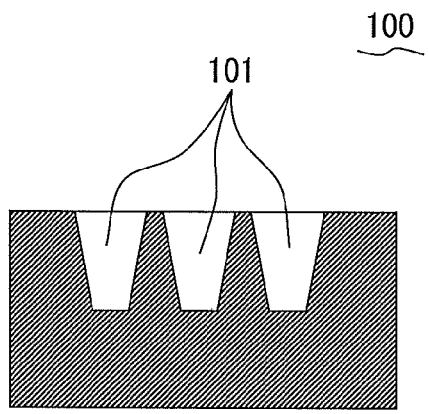
FIG. 1C exemplifies the cross-sectional shape of the groove of a further material measure according to a prior art.
Figure 1D:
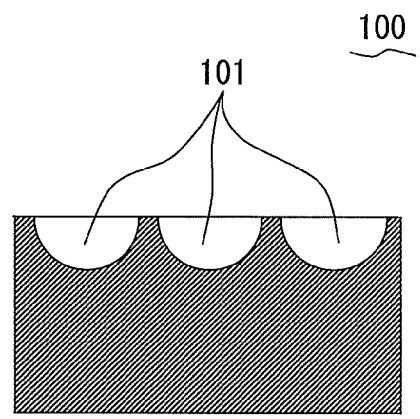
FIG. 1D exemplifies the cross-sectional shape of the groove of a further material measure according to a prior art.
Figure 3A:
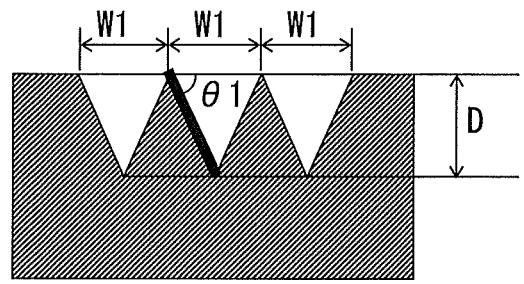
FIG. 3A is an explanatory view of the relationship between the width and the inclination angle of the groove whose cross-section is triangle-shaped.
Figure 3B:
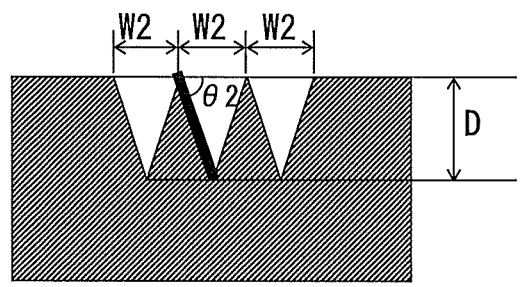
FIG. 3B is an explanatory view of the relationship between the width and the inclination angle of the groove whose cross-section is triangle-shaped.
Figure 4A:
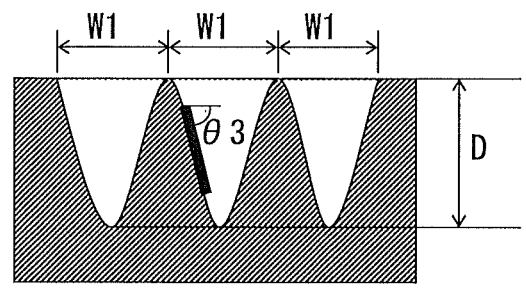
FIG. 4A is an explanatory view of the relationship between the width and the maximum inclination angle of the groove whose cross-section is sine-wave-shaped.
Figure 4B:
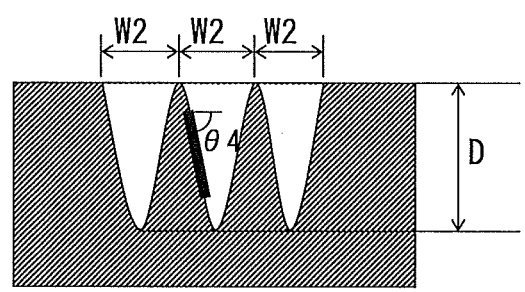
FIG. 4B is an explanatory view of the relationship between the width and the maximum inclination angle of the groove whose cross-section is sine-wave-shaped
Figure 5A:
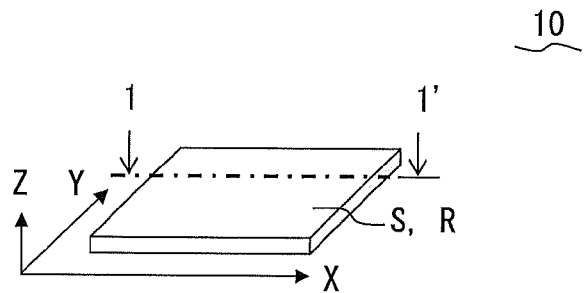
FIG. 5A is a perspective view exemplifying the material measure according to embodiment 1.
Figure 5B:
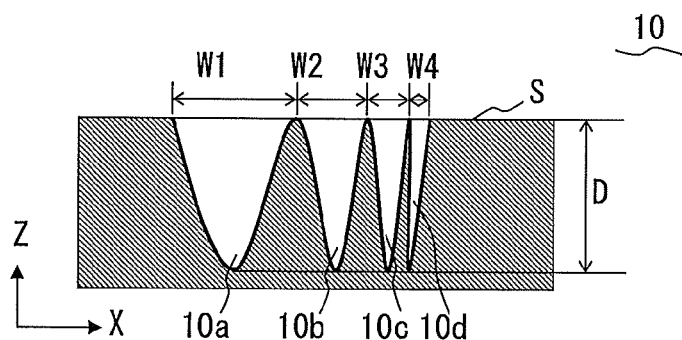
FIG. 5B is an example of a cross-sectional view of the material measure exemplified in FIG. 5A.
Figure 5C:
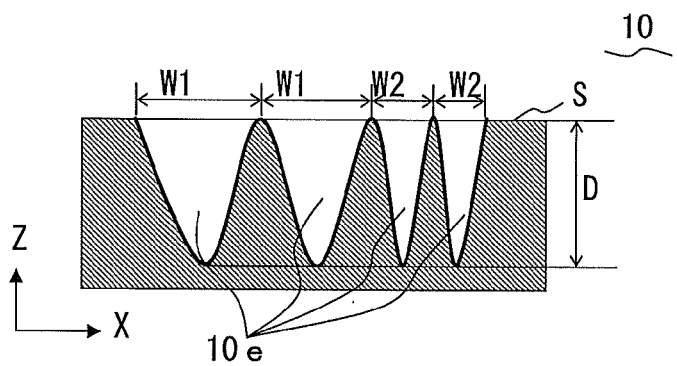
FIG. 5C is another example of a cross-sectional view of the material measure exemplified in FIG. 5A.
Figure 5D:
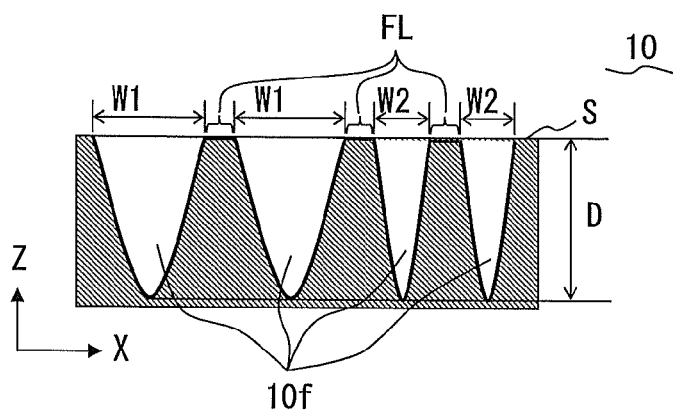
FIG. 5D is a further example of a cross-sectional view of the material measure exemplified in FIG. 5A.

FIGS. 5A through 5D exemplify the material measures according to the present embodiment for use in evaluating the performance of a measuring instrument for measuring surface texture. FIG. 5A is a perspective view of a material measure 10 according to the present embodiment. FIGS. 5B through 5D are cross-sectional views at the cross-sections 1-1' of different material measures 10.

In the XYZ coordinate system exemplified in FIGS. 5A through 5D, the Z direction and the vertical direction, the XY plane, the horizontal plane, and the surface S of the material measure 10, the XZ plane and the cross-section 1-1' of the material measure 10 are parallel to one another. In addition, the X direction, the Y direction and the Z direction are orthogonal to one another.

The material measure 10 has a measurement area R including a plurality of grooves arranged in the X direction (predetermined direction) on the surface S. A measuring instrument measures the measurement area R of the material measure 10, and its performance is evaluated based on the result of the measurement. Each groove formed in the measurement area R on the surface S has a simple cross-sectional shape at the cross-section 1-1' along the X direction. In FIGS. 5A through 5D, the cross-sections of the grooves arranged in the X direction are sine-wave-shaped.

In the material measure 10, the lengths (hereinafter referred to as depths) in the Z direction (depth direction) of the cross-sectional shapes along the grooves arranged in the X direction are constant while the lengths (hereinafter referred to as widths) in the X direction are not constant.

The widths of the cross-sectional shapes of the grooves can be different for a predetermined number of adjacent grooves. As exemplified in FIG. 5B, the width of each cross-sectional shape of the groove arranged in the X direction can be different. In addition, as exemplified in FIGS. 5C and 5D, the widths of the cross-sectional shapes of grooves can be different every two adjacent grooves. It is desired that the widths of the cross-sectional shapes of the grooves decrease in every predetermined number of adjacent grooves.

In FIGS. 5B and 5C, the adjacent grooves in the X direction are continuous, but the present invention is not limited to the formation. As exemplified in FIG. 5D, a flat portion FL can be provided between the grooves. The length (hereinafter referred to as a width) of the flat portion FL in the X direction can be arbitrarily changed. For example, the width of the flat portion FL can be adjusted to cyclically generate a groove in the X direction, that is, to obtain a constant sum of the width of the cross-sectional shape of a groove and the width of the adjacent flat portion FL.

In FIGS. 5B through 5D, the surface S of the material measure 10 is positioned at the same level as the top ends of the grooves, but the present invention is not limited to this formation. For example, the measurement area R can be formed at a lower level than the surface S. In this case, the top ends are not positioned at the same level as the surface S.

Each of the grooves arranged in the X direction is a linear groove parallel to the Y direction (linear direction), and the depth of each groove is constant in the Y direction. That is, a plurality of parallel and linear grooves are formed in the measurement area R of the material measure 10. Therefore, the material measure 10 has the same cross-sectional shape at an arbitrary parallel cross-section as the cross-section 1-1'.

The material measure 10 can be manufactured by processing a piece of monocrystal silicon with a focused ion beam. The material and the processing method of the material measure 10 are not limited if a groove of a target shape can be formed.

The material of the material measure 10 can be metal such as stainless steel etc. and glass. The processing method of the material measure 10 can also be etching or milling in addition to a processing method using a spattering such as FIB processing.

When the performance of a measuring instrument for measuring surface texture is evaluated using the material measure 10 described above, the response characteristic indicating a change in measurement accuracy of the depth of a groove to a change in width of the groove can be checked only by once scanning the measurement area R of the material measure 10 in parallel to the X direction. When the field of view of the measuring instrument is larger than the measurement area R, the response characteristic can be checked by performing the measurement only once with the field of view fixed.

Therefore, as compared with the case in which the response characteristic is acquired by sequentially measuring a plurality of material measures having different widths of grooves using a measuring instrument, the working time required to acquire the response characteristic can be shortened and the work load can be reduced. As a result, the working time and the work load required to evaluate the total performance of the measuring instrument can be shortened and reduced respectively.

The performance evaluation of the measuring instrument using the response characteristic is performed in the same method as the prior art. For example, assume that the measuring instrument scans the material measure 10 having a cross-section exemplified in FIG. 5B, and the response characteristic of the measuring instrument is acquired. If the depth D can be measured within an allowance for grooves 10a through 10c while the depth cannot be measured within the allowance for a groove 10d, then it can be evaluated that the limit of the width for which the measuring instrument can appropriately measure the depth D is a width W3.

FIGS. 6A through 6C exemplify variations of a material measure according to the present embodiment. The material measures exemplified in FIGS. 6A through 6C are different from the material measure 10 only in the cross-sectional shape of the groove. FIG. 6A exemplifies a material measure 11 in which the cross-section of a groove 11a is triangle-shaped. FIG. 6B exemplifies a material measure 12 in which the cross-section of a groove 12a is trapezoid-shaped. FIG. 6C exemplifies a material measure 13 in which the cross-section of a groove 13a is circle-arc-shaped or oval-arc-shaped. The cross-sectional shape of the groove of a material measure can be simple, and can be polygon-shaped.

The material measures according to the present variations have the same effects as the material measure 10. That is, the working time and the work load required to evaluate the total performance of a measuring instrument can be shortened and reduced respectively.

FIGS. 7A and 7B exemplify another variation of a material measure according to the present embodiment. FIG. 7A is a perspective view of a material measure 14 according to the present variation, and FIG. 7B is a cross-sectional view at the cross-section 2-2' of the material measure 14.

In the XYZ coordinate system exemplified in FIGS. 7A and 7B, the Z direction and the vertical direction, the XY plane, the horizontal plane, and the surface S of the material measure 14, the XZ plane and the cross-section 2-2' of the material measure 14 are parallel to one another. In addition, the X direction, the Y direction and the Z direction are orthogonal to one another.

The material measure 14 according to the present variation is different from the material measure 10 in that a plurality of concentric grooves about the position O are included. That is, the material measure 14 has a measurement area R including a plurality of grooves in the radial direction (predetermined direction) of the concentric circles on the surface S.

Each of the grooves formed in the measurement area R of the surface S is sine-wave-shaped at the cross-section 2-2' along the radial direction. FIG. 7A exemplifies the case in which the cross-section 2-2' is the XZ plane including the center O, but the present invention is not limited to this formation. It is only necessary that the cross-section 2-2' includes the center O, and is a plane orthogonal to the XY plane. That is, it is to be a cross-section along the radial direction. The cross-sectional shape of the grooves is not limited to a sine wave shape, but can be any simple shape.

In the material measure 14 according to the present variation, the depths of the cross-sectional shapes of the grooves arranged in the radial direction are constant while the lengths in the radial direction (hereinafter referred to as widths) of the cross-sectional shapes are not constant. Since the grooves of the material measure 14 are arranged in a concentric fashion, the widths of the grooves at the symmetrical positions about the center O are equal as exemplified in FIG. 7B.

The depth of each groove 14a is constant along the circular direction of the concentric circles. Therefore, the material measure 14 has the same cross-sectional shape as the cross-section 2-2' along any radial direction.

As described above, the material measure 14 according to the present variation has the same effect as the material measure 10. That is, the working time and the work load required to evaluate the total performance of the measuring instrument can be shortened and reduced respectively.

<Embodiment 2>

FIGS. 8A through 8B exemplify the material measures according to the present embodiment for use in evaluating the performance of a measuring instrument for measuring surface texture. FIG. 8A is a perspective view of a material measure 15 according to the present embodiment. FIG. 8B is a cross-sectional view at the cross-sections 3-3' of the material measure 15.

In the XYZ coordinate system exemplified in FIGS. 8A and 8B, the Z direction and the vertical direction, the XY plane, the horizontal plane, and the surface S of the material measure 15, the XZ plane and the cross-section 3-3' of the material measure 15 are parallel to one another. In addition, the X direction, the Y direction and the Z direction are orthogonal to one another.

The material measure 15 has a measurement area R including a plurality of grooves in the X direction (predetermined direction) on the surface S. Each groove formed in the measurement area R on the surface S has a simple cross-sectional shape at the cross-section 3-3' along the X direction. In FIG. 8B, the cross-sections of the grooves arranged in the X direction are sine-wave-shaped.

In the material measure 15 according to the present embodiment, the widths and the depths of the cross-sectional shapes of the grooves arranged in the X direction are not constant.

The widths and the depths of the cross-sectional shapes of the grooves can be different for a predetermined number of adjacent grooves. As exemplified in FIG. 8B, the width and the depth of each cross-sectional shape of the groove arranged in the X direction can be different. It is desired that the widths and the depths of the cross-sectional shapes of the grooves decrease in every predetermined number of adjacent grooves.

In FIG. 8B, the adjacent grooves in the X direction are continuous, but the present invention is not limited to the formation. A flat portion can be provided between the grooves. The width of the flat portion can be arbitrarily changed. For example, the width of the flat portion can be adjusted to cyclically generate a groove in the X direction.

In FIG. 8B, the surface S of the material measure 15 is positioned at the same level as the top ends of the grooves, but the present invention is not limited to this formation. For example, the measurement area R can be formed at a lower level than the surface S. In this case, the top ends are not positioned at the same level as the surface S. In FIG. 8B, the height of the top end of each groove matches each other, but the present invention is not limited to this formation. The height of the bottom end of each groove or the height of the intermediate portion between the top end and the bottom end can match each other.

Each of the grooves arranged in the X direction is a linear groove parallel to the Y direction (linear direction), and the depth of each groove is constant in the Y direction. That is, a plurality of parallel and linear grooves are formed in the measurement area R of the material measure 15. Therefore, the material measure 15 has the same cross-sectional shape at an arbitrary parallel cross-section as the cross-section 3-3'.

Since the material and the processing method of the material measure 15 are similar to those of the material measure 10 according to embodiment 1, the description of the material and method is omitted here.

When the performance of a measuring instrument for measuring surface texture is evaluated using the material measure 15 described above, the response characteristic indicating a change in measurement accuracy of the width and the depth of a groove to a change in width and depth of the groove can be checked only by once scanning the measurement area R of the material measure 15 in parallel to the X direction. When the field of view of the measuring instrument is larger than the measurement area R, the response characteristic can be checked by performing the measurement only once with the field of view fixed.

Therefore, as compared with the case in which the response characteristic is acquired by sequentially measuring a plurality of material measures having different widths and depths of grooves using a measuring instrument, the working time required to acquire the response characteristic can be shortened and the work load can be reduced. As a result, the working time and the work load required to evaluate the total performance of the measuring instrument can be shortened and reduced respectively.

The performance evaluation of the measuring instrument using the response characteristic is performed in the same method as the prior art. For example, assume that the measuring instrument scans the material measure 15 having a cross-section exemplified in FIG. 8B, and the response characteristic of the measuring instrument is acquired. If the width and the depth can be measured within an allowance for grooves 15a through 15c while the width and/or the depth cannot be measured within the allowance for a groove 15d, then it can be evaluated that the limit of the combination of the width and the depth for which the measuring instrument can appropriately measure is the combination of a width W3 and a depth D3.

The material measure according to the present embodiment can also include a plurality of concentric grooves instead of the linear grooves parallel to the Y direction (linear direction) as in the case of embodiment 1.

Figure 9A:
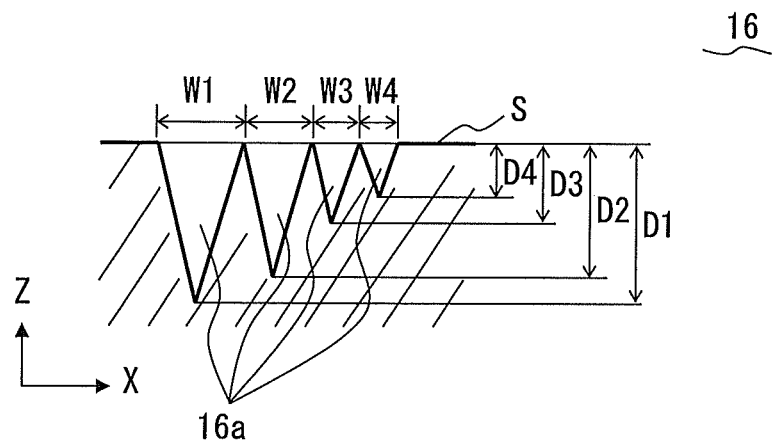
FIG. 9A exemplifies a variation of the material measure according to embodiment 2.
Figure 9B:
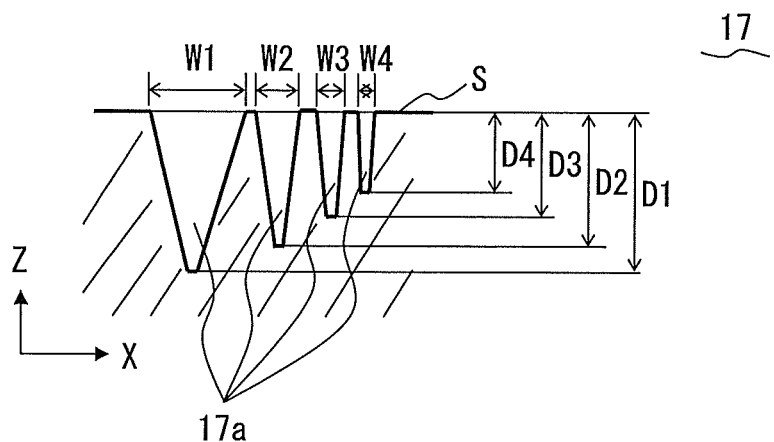
FIG. 9B exemplifies another variation of the material measure according to embodiment 2.
Figure 9C:
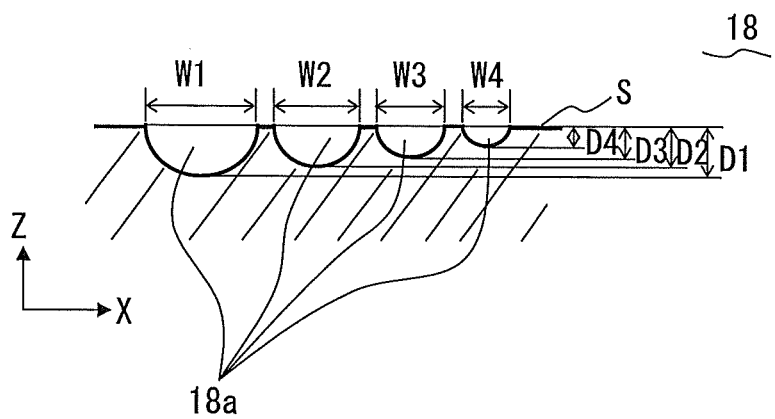
FIG. 9C exemplifies a further variation of the material measure according to embodiment 2.

FIGS. 9A through 9C exemplify variations of a material measure according to the present embodiment. The material measures exemplified in FIGS. 9A through 9C are different from the material measure 15 only in the cross-sectional shape of the groove. FIG. 9A exemplifies a material measure 16 in which the cross-section of a groove 16a is triangle-shaped. FIG. 9B exemplifies a material measure 17 in which the cross-section of a groove 17a is trapezoid-shaped. FIG. 9C exemplifies a material measure 18 in which the cross-section of a groove 18a is circle-arc-shaped or oval-arc-shaped. The cross-sectional shape of the groove of a material measure can be simple, and can be polygon-shaped.

The material measures according to the present variations have the same effects as the material measure 15. That is, the working time and the work load required to evaluate the total performance of a measuring instrument can be shortened and reduced respectively.

<Embodiment 3>

FIGS. 10A and 10B exemplify the material measures according to the present embodiment for use in evaluating the performance of a measuring instrument for measuring surface texture. FIG. 10A is a perspective view of a material measure 19 according to the present embodiment. FIG. 10B is a cross-sectional view at the cross-section 4-4' of the material measures 19.

In the XYZ coordinate system exemplified in FIGS. 10A and 10B, the Z direction and the vertical direction, the XY plane, the horizontal plane, and the surface S of the material measure 19, the XZ plane and the cross-section 4-4' of the material measure 19 are parallel to one another. In addition, the X direction, the Y direction and the Z direction are orthogonal to one another.

The material measure 19 has a measurement area R including a plurality of grooves arranged in the X direction (predetermined direction) on the surface S. Each groove formed in the measurement area R on the surface S has a simple cross-sectional shape at the cross-section 4-4' along the X direction. In FIG. 10B, the cross-sections of the grooves arranged in the X direction are sine-wave-shaped.

In the material measure 19 according to the present embodiment as in the material measure 15 according to embodiment 2, the widths and the depths of the cross-sectional shapes of the grooves arranged in the X direction are not constant. However, the material measure 19 is different from the material measure 15 in that the maximum inclination angle of the profile of the cross-sectional shape of a groove in the X direction (hereinafter referred to simply as the maximum inclination angle) is constant among a plurality of grooves arranged in the X direction.

The widths and the depths of the cross-sectional shapes of the grooves can be different for a predetermined number of adjacent grooves. As exemplified in' FIG. 10B, the width and the depth of each cross-sectional shape of the groove arranged in the X direction can be different. It is desired that the widths and the depths of the cross-sectional shapes of the grooves decrease in every predetermined number of adjacent grooves.

In FIG. 10B, the adjacent grooves in the X direction are continuous, but the present invention is not limited to the formation. A flat portion can be provided between the grooves. The width of the flat portion can be arbitrarily changed. For example, the width of the flat portion can be adjusted to cyclically generate a groove in the X direction.

In FIG. 10B, the surface S of the material measure 19 is positioned at the same level as the top ends of the grooves, but the present invention is not limited to this formation. For example, the measurement area R can be formed at a lower level than the surface S. In this case, the top ends are not positioned at the same level as the surface S. In FIG. 10B, the height of the top end of each groove matches each other, but the present invention is not limited to this formation. The height of the bottom end of each groove or the height of the intermediate portion between the top end and the bottom end can match each other.

Each of the grooves arranged in the X direction exemplified in FIG. 10B is a linear groove parallel to the Y direction (linear direction), and the depth of each groove is constant in the Y direction. That is, a plurality of parallel and linear grooves are formed in the measurement area R of the material measure 19. Therefore, the material measure 19 has the same cross-sectional shape at an arbitrary parallel cross-section as the cross-section 4-4'.

Since the material and the processing method of the material measure 19 are similar to those of the material measure 10 according to embodiment 1, the description of the material and the method is omitted here.

Described below is an example of a method of calculating the surface shape of a material measure for maintaining a constant maximum inclination angle α for the grooves having an arbitrary width and arranged in the X direction. The method of calculating the surface shape of a material measure is not limited to the following method, but other methods can be used.

First, the width $W_n$ of the cross-sectional shape of the grooves arranged in the X direction is arbitrarily determined. In this example, the width $W_n$ indicates the width of the cross-sectional shape of the n-th groove. For example, the width $W_n$ can be a geometric progression ($W_{n+1} = a*W_n$) or an arithmetic progression ($W_{n+1} = W_n + b$).

Next, the function $f_n$ indicating the cross-sectional shape of the groove satisfying the arbitrarily determined width $W_n$ is calculated. In this case, if the cross-section of each groove is sine-wave-shaped, the depth of the cross-sectional shape of each groove is 1, and each groove is continuous with adjacent grooves, then the function $f_n$ is expressed by the following equation (1).

$$f_n(x, y) = \begin{cases} 0 & \left(x < \sum_{i=1}^{n-1} W_i\right) \\ \frac{1}{2}\left\{\cos\left[\frac{2\pi}{W_n}*\left(x - \sum_{i=1}^{n-1} W_i\right)\right] - 1\right\} & \left(\sum_{i=1}^{n-1} W_i \le x \le \sum_{i=1}^{n} W_i\right) \\ 0 & \left(\sum_{i=1}^{n} W_i < x\right) \end{cases} \quad (1)$$

Furthermore, the function F indicating the cross-sectional shape of the material measure satisfying the arbitrarily determined width $W_n$ is calculated by adding up the functions $f_n$ indicating the cross-sectional shapes of the respective grooves. When the number of grooves is N, the function F is expressed by the following equation (2).

$$F(x, y) = \sum_{n=1}^{N} f_n(x, y) \quad (2)$$

Figure 11:
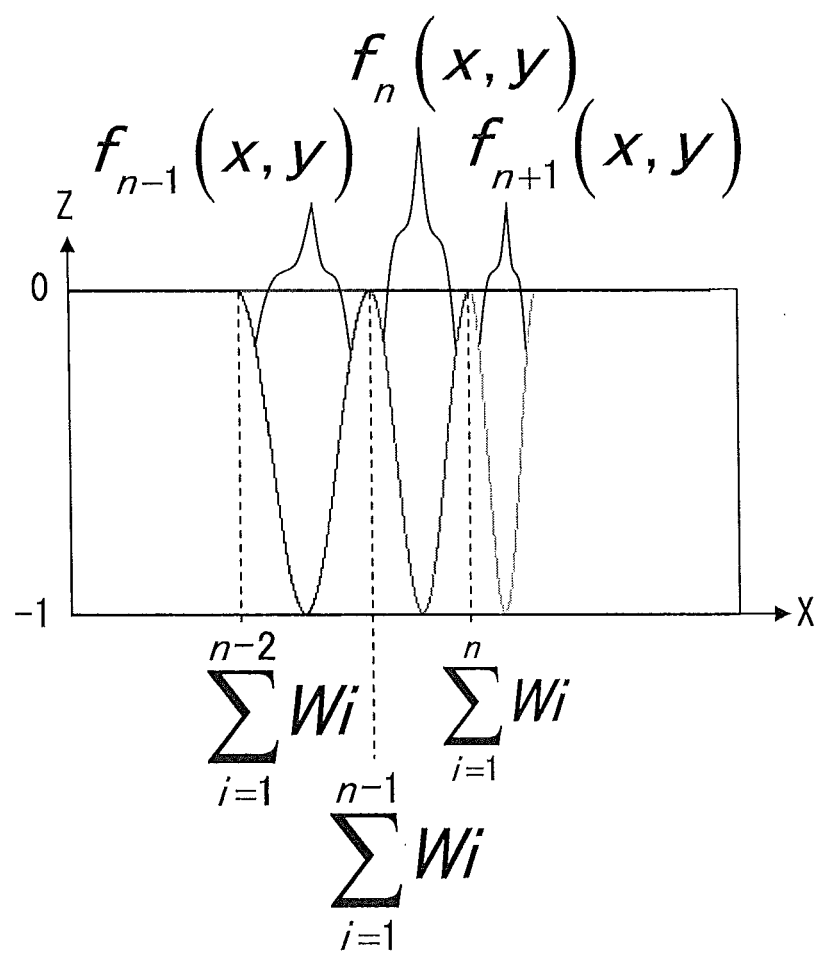
FIG. 11 illustrates the function indicating the cross-sectional shape of the material measure according to embodiment 3.

FIG. 11 illustrates the function F indicating the cross-sectional shape of the material measure satisfying the arbitrarily determined width $W_n$. As illustrated in FIG. 11, the material measure represented by the function F has constant depths of the cross-sectional shapes of grooves while it has different widths of the cross-sectional shapes of the grooves. Therefore, the maximum inclination angle differs for every groove.

Next, the function $f_n$ indicating the cross-sectional shape of each groove is differentiated and the maximum inclination $m_n$ of each groove is calculated. The maximum inclination $m_n$ of each groove of the material measure expressed by equation (2) is expressed by the following equation (3).

$$m_n = \max\left\{\frac{\partial f_n(x, y)}{\partial x}\right\} \quad (3)$$
$$= \max\left\{\frac{-1}{2}*\frac{2\pi}{W_n}*\sin\left(\frac{2\pi}{W_n}*\left(x - \sum_{i=1}^{n-1} W_i\right)\right)\right\} = \frac{\pi}{W_n}$$

The relationship of $m_n = \tan\beta_n$ holds between the maximum inclination angle $\beta_n$ of each groove and the maximum inclination $m_n$ of each groove of the material measure expressed by equation (2). Therefore, in the material measure expressed by equation (2), the maximum inclination angle $\beta_n$ depends on the width $W_n$ of each groove.

Next, the function $f_n$ indicating the cross-sectional shape of each groove is amended and the maximum inclination angle of the cross-sectional shape of each groove is unified. In this case, when the maximum inclination angle is unified as the angle α, the function $g_n$ indicating the cross-sectional shape of each groove is expressed by the following equation (4).

$$g_n(x, y) = \frac{\tan\alpha}{m_n}*f_n(x, y) = \frac{W_n*\tan\alpha}{\pi}*f_n(x, y) \quad (4)$$

Finally, the following equation (5) is calculated by adding up the functions $g_n$ indicating the cross-sectional shape of respective grooves whose maximum inclination angles are unified. Thus calculated is the function G indicating the cross-sectional shape of the material measure which satisfies the arbitrarily determined width $W_n$ and whose maximum inclination angle is unified as the angle α.

$$G(x, y) = \sum_{n=1}^{N} g_n(x, y) \quad (5)$$

By calculating the cross-sectional shape using the above-mentioned calculating method, a material measure having a groove of an arbitrary width and having a constant maximum inclination angle can be easily manufactured.

When the performance of a measuring instrument for measuring surface texture is evaluated using the material measure 19 described above, as in the case according to embodiment 2, the response characteristic indicating a change in measurement accuracy of the width and the depth of a groove to a change in width and depth of the groove can be checked only by once scanning the measurement area R of the material measure 19 in parallel to the X direction. When the field of view of the measuring instrument is larger than the measurement area R, the response characteristic can be checked by performing the measurement only once with the field of view fixed. As a result, the working time and the work load required to evaluate the total performance of the measuring instrument can be shortened and reduced respectively.

The material measure 19 can be preferably used especially in evaluating the performance of an optical measuring instrument and comparing the performance between the optical measuring instrument and a probe measuring instrument. Measuring instruments for measuring surface texture can be roughly classified into contact type measuring instruments represented by probe measuring instruments and non-contact type measuring instruments represented by optical measuring instruments. Since optical measuring instruments measure the surface texture by detecting reflected light from a material measure, the inclination angle of a groove affects a measurement result because whether or not the reflected light has been detected depends on the numerical aperture of a measuring instrument (to be more strict, the numerical aperture of an objective of the measuring instrument) and the inclination angle of the grooves. However, since the material measure 19 has a constant maximum inclination angle of each groove, the influence of the inclination angle can be eliminated. Accordingly, the reliability of the performance evaluation of an optical measuring instrument can be improved as high as the performance evaluation of a probe measuring instrument. In addition, the difference in measurement result between the optical measuring instruments and the probe measuring instruments can be suppressed.

Furthermore, the material measures according to the present embodiment can include a plurality of concentric grooves instead of linear grooves parallel to the Y direction (linear direction).

FIGS. 12A through 12C exemplify variations of a material measure according to the present embodiment. The material measures exemplified in FIGS. 12A through 12C are different from the material measure 19 only in the cross-sectional shape of the groove. FIG. 12A exemplifies a material measure 20 in which the cross-section of a groove 20a is triangle-shaped. FIG. 12B exemplifies a material measure 21 in which the cross-section of a groove 21a is trapezoid-shaped. FIG. 12C exemplifies a material measure 22 in which the cross-section of a groove 22a is circle-arc-shaped or oval-arc-shaped. The cross-sectional shape of the groove of a material measure can be simple, and can be polygon-shaped.

The material measures according to the present variations have the same effects as the material measure 19. That is, the working time and the work load required to evaluate the total performance of a measuring instrument can be shortened and reduced respectively. Furthermore, the reliability of the performance evaluation of an optical measuring instrument can be improved as high as the performance evaluation of a probe measuring instrument. In addition, the difference in measurement result between the optical measuring instruments and the probe measuring instruments can be suppressed.

<Embodiment 4>

FIGS. 13A through 13C exemplify the material measures according to the present embodiment for use in evaluating the performance of a measuring instrument for measuring surface texture. FIG. 13A is a perspective view of a material measure 23 according to the present embodiment. FIG. 13B is a cross-sectional view at the cross-sections 5-5' of the material measure 23, and FIG. 13C is a cross-sectional view at the cross-sections 6-6' of the material measure 23

In the XYZ coordinate system exemplified in FIGS. 13A through 13C, the Z direction and the vertical direction, the XY plane, the horizontal plane, and the surface S of the material measure 23, the XZ plane and the cross-section 5-5' and the cross-section 6-6' of the material measure 23 are parallel to one another. In addition, the X direction, the Y direction and the Z direction are orthogonal to one another.

The material measure 23 has a measurement area R including a plurality of grooves in the X direction (predetermined direction) on the surface S. To be more concrete, a plurality of linear grooves parallel to one another are formed in the measurement area R of the material measure 23, and each groove is parallel to one another in the Y direction (linear direction).

Each of the grooves formed in the measurement area R on the surface S has a simple cross-sectional shape at the cross-section along the X direction. In FIGS. 13A through 13C, the cross-sections of the grooves arranged in the X direction are sine-wave-shaped.

The material measure 23 according to the present embodiment is similar to the material measure 19 according to embodiment 3 in that the widths and the depths of the cross-sectional shapes of the grooves arranged in the X direction are not constant and the maximum inclination angle is constant. However, it is different from the material measure 19 in that each of the grooves of the material measure 23 is different from one another in depth and maximum inclination angle in the Y direction (linear direction).

For example, as exemplified in FIG. 13B, the maximum inclination angles of the grooves of the widths W1, W2, W3, and W4 are unified as the angle $\alpha 1$ at the cross-section 5-5'. On the other hand, as exemplified in FIG. 13C, the maximum inclination angles of the grooves of the widths W1, W2, W3, and W4 are unified as the angle $\alpha 2$ at the cross-section 6-6'. That is, in each groove, the maximum inclination angle is continuously changed with a constant width of the groove in the Y direction. It is desired that, in each groove, the depth of the cross-sectional shape of the groove and the maximum inclination angle gradually decrease in the Y direction.

The widths and the depths of the cross-sectional shapes of the grooves can be different for a predetermined number of adjacent grooves. As exemplified in FIGS. 13B and 13C, the width and the depth of each cross-sectional shape of the groove arranged in the X direction can be different. It is desired that the widths and the depths of the cross-sectional shapes of the grooves decrease in every predetermined number of adjacent grooves.

In FIGS. 13B and 13C, the adjacent grooves in the X direction are continuous, but the present invention is not limited to the formation. A flat portion can be provided between the grooves. The width of the flat portion can be arbitrarily changed. For example, the width of the flat portion can be adjusted to cyclically generate a groove in the X direction.

In FIGS. 13B and 13C, the surface S of the material measure 23 is positioned at the same level as the top ends of the grooves, but the present invention is not limited to this formation. For example, the measurement area R can be formed at a lower level than the surface S. In this case, the top ends are not positioned at the same level as the surface S. In FIGS. 13B and 13C, the height of the top end of each groove matches each other, but the present invention is not limited to this formation. The height of the bottom end of each groove or the height of the intermediate portion between the top end and the bottom end can match each other.

Since the material and the processing method of the material measure 23 are similar to those of the material measure 10 according to embodiment 1, the description of the material and the method is omitted here.

Described below is an example of a method of calculating the surface shape of a material measure with the maximum inclination angle $\alpha$ of a groove changed in the Y direction while maintaining the constant maximum inclination angle $\alpha$ of the grooves arranged in the X direction. The method of calculating the surface shape of the material measure is not limited to the following method, but other methods can be used.

The surface shape in the X direction is similar to that according to embodiment 3. Therefore, the conditional equations (1), (4), and (5) are used. Then the maximum inclination angle $\alpha$ can be an arbitrary function $\alpha$ (y) in accordance with the Y direction.

That is, the function $g_n$ indicating the cross-sectional shape of each groove can be amended by the conditional equations (4) and can be expressed by the follow conditional equation (6).

$$g_n(x, y) = \frac{\tan(\alpha(y))}{m_n} * f_n(x, y) = \frac{W_n * \tan(\alpha(y))}{\pi} * f_n(x, y) \quad (6)$$

When the maximum inclination angle is linearly changed with respect to the Y direction, the function α (y) indicating the maximum inclination angle is expressed by equation (7).

$$\alpha(y) = by + c \quad (7)$$

Furthermore, for example, when the width of the measurement area R in the Y direction is 100, and the maximum inclination angle is changed from 45° to 9°, the function α (y) indicating the maximum inclination angle is expressed by the following equation (8).

$$\alpha(y) = -\frac{\pi}{500}y + \frac{\pi}{4} \quad (8)$$

By calculating the cross-sectional shape by the above-mentioned calculating method, a material measure whose maximum inclination angle changes in the Y direction can be easily manufactured.

When the performance of a measuring instrument for measuring surface texture is evaluated using the material measure 23 according to the present embodiment, in the specific inclination angle, the response characteristic indicating a change in measurement accuracy of the width and the depth of a groove to a change in the width and depth of the groove can be checked only by once scanning the measurement area R of the material measure 23 in parallel to the X direction as in the case according to embodiment 3. In addition, only by shifting the relative positions of a measuring instrument and a material measure in the Y direction, the response characteristic at another inclination angle can be easily checked. When the field of view of the measuring instrument is larger than the measurement area R, the response characteristic of various inclination angles can be checked by performing the measurement only once with the field of view fixed. Therefore, the working time and the work load required to evaluate the total performance of the measuring instrument can be shortened and reduced respectively.

As with the material measure 19, the material measure 23 can be preferably used especially in evaluating the performance of an optical measuring instrument and comparing the performance between the optical measuring instrument and a probe measuring instrument. Therefore, the reliability of the performance evaluation of an optical measuring instrument can be improved as high as the performance evaluation of a probe measuring instrument. In addition, the difference in measurement result between the optical measuring instruments and the probe measuring instruments can be suppressed.

Furthermore, the material measures according to the present embodiment can include a plurality of concentric grooves instead of linear grooves parallel to the Y direction (linear direction). Each groove can be different in maximum inclination angle in the circular direction of the concentric circles.

Figure 14A:
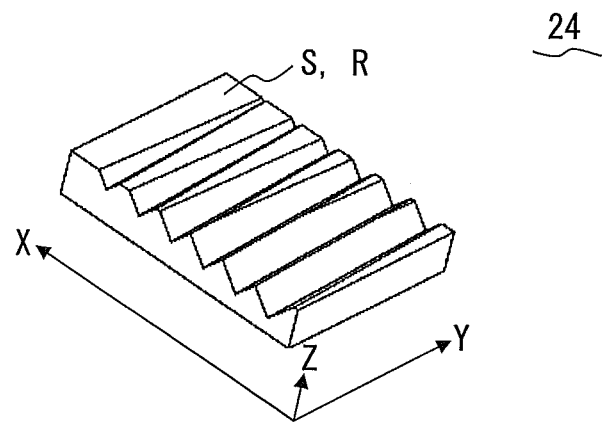
FIG. 14A is a perspective view exemplifying a variation of the material measure according to embodiment 4.
Figure 14B:
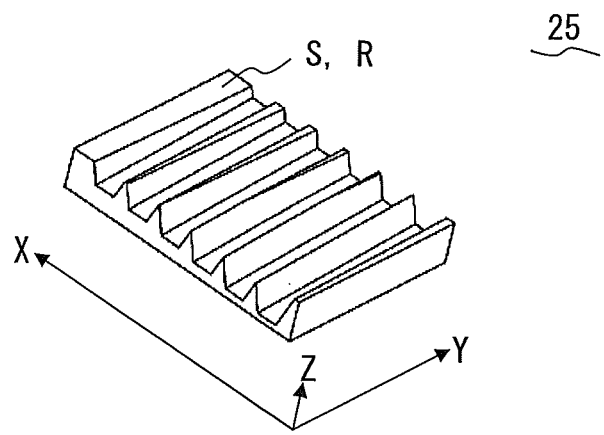
FIG. 14B is a perspective view exemplifying another variation of the material measure according to embodiment 4.
Figure 14C:
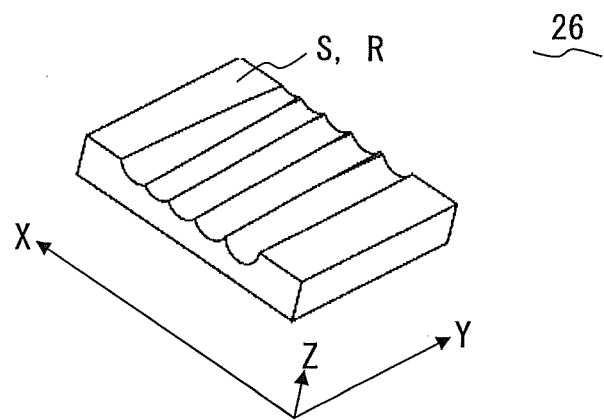
FIG. 14C is a perspective view exemplifying a further variation of the material measure according to embodiment 4.

FIGS. 14A through 14C exemplify variations of a material measure according to the present embodiment. The material measures exemplified in FIGS. 14A through 14C are different from the material measure 23 only in the cross-sectional shape of the groove. FIG. 14A exemplifies a material measure 24 in which the cross-section of a groove is triangle-shaped. FIG. 14B exemplifies a material measure 25 in which the cross-section of a groove is trapezoid-shaped. FIG. 14C exemplifies a material measure 26 in which the cross-section of a groove is circle-arc-shaped or oval-arc-shaped. The cross-sectional shape of the groove of a material measure can be simple, and can be polygon-shaped.

The material measures according to the present variations have the same effects as the material measure 23. That is, the working time and the work load required to evaluate the total performance of a measuring instrument can be shortened and reduced respectively. In addition, the reliability of the performance evaluation of an optical measuring instrument can be improved as high as the performance evaluation of a probe measuring instrument. In addition, the difference in measurement result between the optical measuring instruments and the probe measuring instruments can be suppressed.

<Embodiment 5>

FIGS. 15A through 15C exemplify the material measures according to the present embodiment for use in evaluating the performance of a measuring instrument for measuring surface texture. FIG. 15A is a perspective view of a material measure 27 according to the present embodiment. FIG. 15B is a cross-sectional view at the cross-sections 7-7' of the material measure 27, and FIG. 15C is a cross-sectional view at the cross-sections 8-8' of the material measure 27

In the XYZ coordinate system exemplified in FIGS. 15A through 15C, the Z direction and the vertical direction, the XY plane, the horizontal plane, and the surface S of the material measure 27, the XZ plane, the cross-section 7-7' and the cross-section 8-8' of the material measure 27 are parallel to one another. In addition, the X direction, the Y direction and the Z direction are orthogonal to one another.

The material measure 27 has a measurement area R including a plurality of grooves in the X direction (predetermined direction) on the surface S. To be more concrete, a plurality of linear grooves parallel to one another are formed in the measurement area R of the material measure 27, and each groove is parallel to one another in the Y direction (linear direction).

Each of the grooves formed in the measurement area R on the surface S has a simple cross-sectional shape at the cross-section along the X direction. In FIGS. 15B and 15C, the cross-sections of the grooves arranged in the X direction are sine-wave-shaped, but the present invention is not limited to this application. That is, they cay be polygonal such as triangle-shaped or trapezoid-shaped, and they can also be circle-arc-shaped or oval-arc-shaped.

The material measure 27 according to the present embodiment is similar to the material measure 10 according to embodiment 1 in that the widths of the cross-sectional shapes of the grooves arranged in the X direction are not constant and the depth is constant. However, it is different from the material measure 10 in that each of the grooves of the material measure 27 is different from one another in depth in the Y direction (linear direction).

For example, as exemplified in FIG. 15B, the depth of each groove of the widths W1, W2, W3, and W4 is depth D1 at the cross-section 7-7'. On the other hand, as exemplified in FIG. 15C, the depth of each groove of the widths W1, W2, W3, and W4 is depth D2 at the cross-section 8-8'. That is, in each groove, the depth is continuously changed with a constant width of the groove in the Y direction. It is desired that, in each groove, the depth of the cross-sectional shape of the groove gradually decreases in the Y direction.

The widths of the cross-sectional shapes of the grooves can be different for a predetermined number of adjacent grooves. As exemplified in FIGS. 15B and 15C, the width of each cross-sectional shape of the groove arranged in the X direction can be different. It is desired that the widths of the cross-sectional shapes of the grooves decrease in every predetermined number of adjacent grooves.

In FIGS. 15B and 15C, the adjacent grooves in the X direction are continuous, but the present invention is not limited to the formation. A flat portion can be provided between the grooves. The width of the flat portion can be arbitrarily changed. For example, the width of the flat portion can be adjusted to cyclically generate a groove in the X direction.

In FIGS. 15B and 15C, the surface S of the material measure 27 is positioned at the same level as the top ends of the grooves, but the present invention is not limited to this formation. For example, the measurement area R can be formed at a lower level than the surface S. In this case, the top ends are not positioned at the same level as the surface S.

Since the material and the processing method of the material measure 27 are similar to those of the material measure 10 according to embodiment 1, the description of the material and the method is omitted here.

When the performance of a measuring instrument for measuring surface texture is evaluated using the material measure 27 described above, in the specific inclination angle, the response characteristic indicating a change in measurement accuracy of the depth of a groove to a change in width of the groove can be checked only by once scanning the measurement area R of the material measure 27 in parallel to the X direction. In addition, the response characteristic at another depth can be easily checked by only shifting the relative positions of the measuring instrument and the material measure in the Y direction. When the field of view of the measuring instrument is larger than the measurement area R, the response characteristic can be checked by performing the measurement only once with the field of view fixed.

Therefore, as compared with the conventional method in which the response characteristic is acquired by sequentially measuring a plurality of material measures having different widths and depths of grooves using a measuring instrument, the working time required to acquire the response characteristic can be shortened and the work load can be reduced. As a result, the working time and the work load required to evaluate the total performance of the measuring instrument can be shortened and reduced respectively.

The material measure according to the present embodiment can also include a plurality of concentric grooves instead of the linear grooves parallel to the Y direction (linear direction) as in the case of embodiment 1. The depth of the cross-sectional shape of each groove can be different in the circular direction of the concentric circles. In this case, it is desired that the depth of the cross-sectional shape of the groove gradually decreases in the Y direction.

<Embodiment 6>

Figure 16:
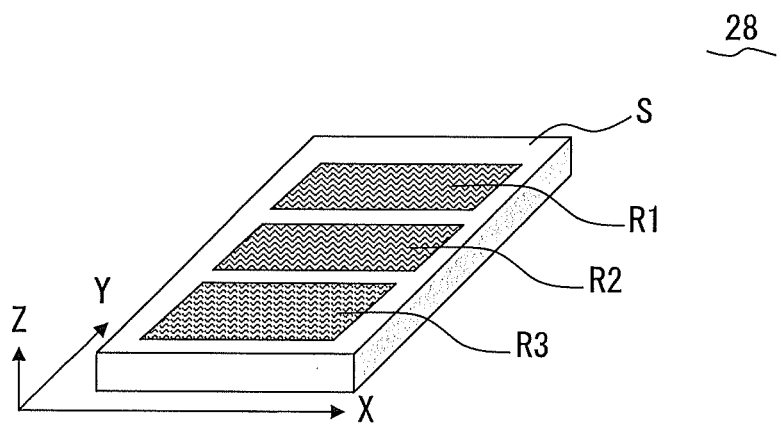
FIG. 16 is a perspective view exemplifying the material measure according to embodiment 6.

FIG. 16 exemplifies the material measures according to the present embodiment for use in evaluating the performance of a measuring instrument for measuring surface texture. The material measure 28 according to the present embodiment has a plurality of measurement areas (measurement areas R1, R2, and R3) on the surface S. The plurality of measurement areas are arranged in the Y direction (linear direction).

In the XYZ coordinate system exemplified in FIG. 16, the Z direction and the vertical direction, the XY plane, the horizontal plane, and the surface S of the material measure 28 are parallel to one another. In addition, the X direction, the Y direction and the Z direction are orthogonal to one another.

Each measurement area includes a plurality of grooves in the X direction (predetermined direction). In each measurement area, a plurality of linear grooves are formed in parallel, and each groove is parallel to the Y direction (linear direction). In each groove, the width and the depth of the groove are constant in the Y direction.

The surface shape of a measurement area is similar to the surface shapes of the material measures according to embodiments 1 through 3. Among the measurement areas, the states such as depths, maximum inclination angles, etc. as variables of the response characteristic are different.

For example, when the surface shape of a measurement area is similar to the surface shape of the material measure according to embodiment 1, the depths of the cross-sectional shapes of the grooves are different in the measurement areas R1, R2, and R3. When the surface shape of a measurement area is similar to the surface shape of the material measure according to embodiment 3, the maximum inclination angles of the profiles of the cross-sectional shapes of the grooves in the X direction are different in the measurement areas R1, R2, and R3.

Since the material and the processing method of the material measure 28 are similar to those of the material measure 10 according to embodiment 1, the description of the material and the method is omitted here.

When the performance of a measuring instrument for measuring surface texture is evaluated using the material measure 28 described above, the response characteristic can be checked only by once scanning any measurement area of the material measure 28 in the X direction. In addition, the response characteristic with different depths and maximum inclination angles can be easily checked by only shifting the relative positions of the measuring instrument and the material measure in the Y direction and scanning another measurement area. When the field of view of the measuring instrument is larger than the measurement area, the response characteristic can be checked by performing the measurement only once with the field of view fixed.

Therefore, as compared with the case in which the response characteristic is acquired by sequentially measuring a plurality of material measures having different widths and depths of grooves using a measuring instrument, the working time required to acquire the response characteristic can be shortened and the work load can be reduced. As a result, the working time and the work load required to evaluate the total performance of the measuring instrument can be shortened and reduced respectively.

Furthermore, the material measure 28 has a constant cross-sectional shape along the X direction in the area. Therefore, the position accuracy required when the relative position of the material measure to the measuring instrument is shifted in the Y direction can be moderated. As a result, the performance of the measuring instrument can be prevented from being erroneously evaluated by the shift of the position.

Described above is the case in which a groove, that is, a concave pattern, is formed on the surface S of a material measure in embodiments 1 through 6. However, the present invention is not limited to this case, and a projection, that is, a convex pattern, can be formed on the surface S of a material measure for a similar effect.

What is claimed is:

1. A material measure for use in evaluating performance of a measuring instrument for measuring surface texture, comprising
   a measurement area having a plurality of grooves in a predetermined direction, wherein:
   each of the grooves has a simple cross-sectional shape at a cross-section along the predetermined direction;
   a length of the cross-sectional shape in the predetermined direction is different for a predetermined number of adjacent grooves in the predetermined direction, the plurality of grooves are linear grooves formed in parallel with a direction orthogonal to the cross-section, in the cross-section, a maximum inclination angle of a profile of the cross-sectional shape to the predetermined direction is constant between the plurality of grooves arranged in the predetermined direction, and, when a direction orthogonal to the predetermined direction in the cross-section is a depth direction and the direction orthogonal to the cross-section is a linear direction, in each of the grooves, a depth of the groove and the maximum inclination angle are different in the linear direction.

2. The material measure according to claim 1, wherein a length of the cross-sectional shape in the predetermined direction decreases for a predetermined number of adjacent grooves in the predetermined direction.

3. The material measure according to claim 1, wherein in the cross-section, the length of the cross-sectional shape in the depth direction is different for the predetermined number of adjacent grooves in the predetermined direction.

4. The material measure according to claim 3, wherein in the cross-section, the length of the cross-sectional shape in the depth direction decreases for the predetermined number of adjacent grooves in the predetermined direction.

5. The material measure according to claim 3, comprising a plurality of measurement areas, wherein the maximum inclination angle of the profile of the cross-sectional shape with respect to the predetermined direction is different for each measurement area.

6. The material measure according to claim 5, wherein:

when each of the measurement areas has the plurality of linear grooves formed parallel to one another, the predetermined direction is orthogonal to a linear direction of the groove; and the plurality of measurement areas are arranged in the linear direction.

7. The material measure according to claim 1, wherein in each of the grooves, a depth of the groove gradually decreases in the linear direction.

8. The material measure according to claim 1, wherein in each of the grooves, a maximum inclination angle of the groove to the predetermined direction is different in the linear direction.

9. The material measure according to claim 8, wherein in each of the grooves, a maximum inclination angle of the groove to the predetermined direction gradually decreases in the linear direction.

10. The material measure according to claim 1, wherein the cross-sectional shape is sine-wave-shaped.

11. The material measure according to claim 1, wherein the cross-sectional shape is arc-shaped.

12. The material measure according to claim 1, wherein the cross-sectional shape is polygon-shaped.

13. The material measure according to claim 1, wherein:

the predetermined direction is parallel to a surface of the material measure; and the cross-section is orthogonal to the surface.

* * * * *